United States Patent
Peterson

(10) Patent No.: US 7,017,806 B2
(45) Date of Patent: Mar. 28, 2006

(54) METHOD OF SELECTING AND STORING AIRLINE TICKET DATA

(76) Inventor: Stanley K. Peterson, 24701 W. 63rd St., Shawnee, KS (US) 66226

( * ) Notice: Subject to any disclaimer, the term of this patent is extended or adjusted under 35 U.S.C. 154(b) by 0 days.

(21) Appl. No.: 10/971,410

(22) Filed: Oct. 22, 2004

(65) Prior Publication Data

US 2005/0091088 A1 Apr. 28, 2005

Related U.S. Application Data

(60) Provisional application No. 60/513,871, filed on Oct. 22, 2003.

(51) Int. Cl.
*G07B 15/02* (2006.01)
(52) U.S. Cl. ........................ 235/384; 382/115
(58) Field of Classification Search ............... 235/384; 382/115; 713/172, 176
See application file for complete search history.

(56) References Cited

U.S. PATENT DOCUMENTS

| | | | |
|---|---|---|---|
| 5,388,158 A * | 2/1995 | Berson | 713/176 |
| 5,754,657 A * | 5/1998 | Schipper et al. | 380/258 |
| 5,866,888 A * | 2/1999 | Bravman et al. | 235/375 |
| 6,216,227 B1 * | 4/2001 | Goldstein et al. | 713/172 |
| 2003/0149343 A1 * | 8/2003 | Siegel et al. | 600/300 |
| 2004/0190757 A1 * | 9/2004 | Murphy et al. | 382/115 |

\* cited by examiner

*Primary Examiner*—Daniel Stcyr
*Assistant Examiner*—Daniel A. Hess
(74) *Attorney, Agent, or Firm*—Shughart Thomson & Kilroy PC

(57) ABSTRACT

A method is provided for receiving a data stream of an airline ticketing reservations computer, striping-away data bits included for the ordering and identifying and reading and writing of the data stream on magnetic media and selecting and converting the remaining data into multi-dimensional symbology or bar code for printing onto airline ticket and/or boarding documents.

6 Claims, 6 Drawing Sheets

METHOD OF SELECTING AND STORING AIRLINE TICKET DATA

CROSS REFERENCE

This application claims benefit of U.S. Provisional Patent Application Ser. No. 60/513,871 filed Oct. 22, 2003.

FIELD OF THE INVENTION

The present invention relates to the processing of airline tickets and/or boarding passes or, generally, boarding authorizations or tickets related to the purchase of passage on an airliner. More particularly, the present invention relates to the use of streams of computer data code intended for printing onto documents or for recording onto magnetic media on documents and the selection and allocation of portions of the data stream for representation in multi-dimensional symbology for scanable reading with or without the representation of all or some of the data stream in magnetically readable stored data.

BACKGROUND OF THE INVENTION

Computer reservations systems (CRS), also known as global distribution systems (GDS) are used by travel industry employees worldwide to make airline, hotel and car rental reservations for their clients. They also are used to calculate airfares and issue airline tickets. In particular, information for airline passenger reservations is entered into central computer system and this information, or at least parts of the information, is then shared with, or available to, other airlines and ticketing agencies. For the purposes of this specification these types of computer reservation systems shall be defined as "shared computer reservation systems" (SCRS) as the data they contain is accessible to and/or shared by more than one airline.

During the creation of an airline travel document (FIGS. 4–5) for an airline flight, the computer data from the SCRS is downloaded by the ticketing agent at the airline counter in the airport or by a travel agent or ticket reseller (Travelocity.com) and portions of the available downloaded information are recorded onto a magnetic stripe on the backside of the boarding document (FIG. 5). This information is then carried by the passenger to the gate area where the information recorded on the boarding document is confirmed by reading the recorded information and comparing it to the data associated with the boarding document in the central computer system of the airline or on a local area network.

The information is recorded onto a magnetic stripe on the back of the boarding document as heretofore only magnetic stripes were able to hold the amount of data needed to be contained on the boarding documents in an inexpensive and portable manner which also permitted, within the air terminal, recording and re-recording and reading of the information. Magnetic stripe recording is similar to audio and video recording. In magnetic stripe recording the magnetic material is applied to a paper or plastic card or ticket. The data is stored on the stripe instead of on tape. The stripes can be recorded, read, and re-recorded multiple times. The black or brown magnetic stripe is made up of magnetic particles of resin. Brown stripes are generally low-coercivity (LoCo), while black stripes are high-coercivity cards (HiCo). Coercivity is the ability of the magnetic stripe to resist demagnetization. The resin particle material used determines the coercivity of the stripe: low-coercivity stripes of 300 Oe (oersteds) are made of iron oxide and high-coercivity stripes of 2750 to 4000 Oe are usually made from barium ferrite. The higher the coercivity, the harder it is to encode—and erase—information from the stripe.

The data on magnetic stripes is recorded in "tracks" much like audio sound tracks. A single magnetic stripe has multiple tracks on it that are available for recording. There are four track locations on a standard credit or ATM card. In other magnetic stripe uses, such as airline tickets and/or boarding passes the track locations and data format do not necessarily follow the standards set out for financial cards. The four magnetic tracks have been assigned names and numbers as listed below:

"Track 1" as used by the International Air Transportation Association (IATA), contains alphanumeric information for airline ticketing or other transactions where a reservation database is accessed.

"Track 2" was developed by the American Bankers Association (ABA) contains numeric information for the automation of financial transactions. Track 2 is also used by most systems that require an identification number and a minimum of other control information.

"Track 3" typically contains information which is intended to be updated during each transaction. For example for a private gift card that operates "off-line" from a central computer, the cash register might read the contents of this track to determine the amount of value on the card. At the conclusion of a transaction this track of the card would be updated with the new value of the card reflecting the old card value minus the amount of the concluded transaction.

"Track 4" is reserved.

A magnetic stripe is encoded with bit patterns, which correspond to alphanumeric (Track 1) or numeric (Tracks 2 & 3) ASCII characters. The number of bits on a given track is limited to a certain number of bits per inch, or BPI. There are also a series of all zero bits encoded at the beginning and end of a magnetic stripe. These all zero bits are known as "clocking bits" and establish timing for the code reading device.

The magnetic striped cards used for airline boarding documents present a number of deficiencies to the cost conscious airline industry. Each magnetic card blank cost the airline between seven and eleven cents ($0.07–$0.11) each to purchase. New magnetic stripe boarding pass cards have a failure rate of approximately five to seven percent (5–7%) on the first attempt. This failure rate is incurred while attempting to read and confirm the pre-recorded serial number, or stock control number, (FIG. 4) that is applied to each card before any writing is attempted on the card. A second failure rate of approximately five to seven percent (5–7%) on the first attempt is presented by magnetic stripe boarding pass cards upon attempting to read the recorded information after the recording process at the airline check-in counter. Thus an average overall failure rate of approximately fourteen percent (10–14%) is presented in the day to day use of magnetic stripe boarding pass cards. For an airline using 2 million such documents this represents a loss of $28,000 in unusable card stock. In contrast, a ticket or boarding document blank that does not contain a magnetic stripe costs approximately three-thousandths of a cent each ($0.003) to purchase and avoids the failure rate associated with a magnetic stripe.

Further, the use of magnetic stripe cards for recording ticket and boarding document information requires that air carriers use thousands of magnetic stripe printers and readers which are very expensive devices to purchase and to keep in repair. For example, a typical magnetic stripe recorder and text printer device costs approximately $4,000 per machine. The corresponding magnetic stripe reader device used at a jetway or boarding gate costs approximately $6,000. Since each airline must purchase its own devices for each airport ticket counter and gate, tens of thousands of these devices must be purchased by airlines and replacement devices must be kept on hand to replace defective devices. For an airline operating in only 15 airports and having 10 ticketing locations in each airport using writer devices and 15 aircraft gates in each airport using reader devices, the basic cost of using magnetic stripe card reader/writer equipment would be approximately $1,950,000 in equipment purchase costs. This cost does not include the cost of the magnetic card stock having a fourteen percent (14%) waste component or the costs of stocking replacement units at each airport.

In contrast, a typical reader/writer unit for printing and reading multi-dimensional bar codes costs approximately $1,000 and the scanner device used at the boarding gate costs between $300 and $400 dollars. Thus, the equipment cost for the airline operating at 15 airports and having 10 ticketing locations in each airport using writer devices and 15 aircraft gates in each airport using reader devices, would be approximately $240,000 when avoiding the use of magnetic stripe cards. A savings of $1,710,000 in equipment.

The information recorded onto magnetic stripe boarding pass cards is data about the passenger, the passenger's flight itinerary; passenger contact information, security information, number of bags checked on the flight, and other information. Some of this data is used by the air carrier to document passenger preferences and other information is used to identify and verify the passenger at the time of flight boarding.

Every airline reservation for a passenger, or group of passengers, is associated with a booking code under which the reservation is stored in a central booking computer. This booking code is known as the Passenger Name Record (PNR). It is defined by means of a combination of five or six letters and numbers. In the PNR, additional information on the traveler or special service requests can also be included. Since one PNR is created for each travel plan, passenger name records and passengers do not necessarily match up one to one: a group traveling together may have one record with only travel agency information in it.

Each PNR has five mandatory fields: number of passengers and their names; contact phone number; ticketing information; ticket order received-from data; and itinerary. Each part that contains data about the passenger is referred to as a field. The passenger data fields thus include a Name field, Phone field, Ticketing field, and Received-from field. Each field has an identifier, or function code, which is used to enter data into that field. For example, the identifier for the Name field is the hyphen. This field identifier tells the computer system what field to use for storing the data.

Name Field

The Name field contains one or more name items. Passenger names are grouped together by last name. All passengers who share a last name are listed in a collective name item. A PNR may contain one or more name items—for example, parties with different surnames. For international travel, the passenger's complete name should be entered in the PNR, as documented on the traveler's passport.

Phone Field

Each PNR must include at least one contact phone number for one member of the traveling party. In addition, the travel agency phone number is customarily entered first, with passenger contact phone numbers listed in the following order: business, home, hotel, if available and applicable. Multiple numbers can be entered for each passenger, but each phone listing must be identified as Agency, Business, Home, or Hotel.

Ticketing Field

Information entered in the Ticketing field depends on the ticketing arrangements requested by the passenger. For example, if the tickets will be printed on a future date, the intended ticketing date is entered. On that date the PNR will appear automatically in an electronic holding area called the ticketing queue. By looking in the queue, the agent can determine which reservations are scheduled to be ticketed on that day. If a prepaid ticket advisory (PTA) is sent to the airline, the PTA date is entered. Information in the Ticketing field is identified by a function code, and only one entry is allowed in the Ticketing field. This limitation is known as a single-field entry. The ticketing field can also be used to record a time limit in conjunction with a passenger reservation, for example, a client might wish that tickets be issued at the airport prior to departure. The recent advent of electronic ticketing or e-tickets has eliminated some of the complications previously associated with providing the passenger with ticket documents.

Received from Field

A received-from entry is used to record the party who placed the air reservation, be it the passenger, parent, secretary, etc.

Itinerary Field

The itinerary consists of one or more air segments. Each segment represents a confirmed, requested or wait-listed reservation on a designated flight.

When a travel agent makes a reservation, they enter data on a computer reservations systems/global distribution systems (CRS/GDS) terminal, and create a PNR in that CRS/GDS. If the airline is hosted in a different CRS/GDS, information about the flight(s) on that airline is sent to the airline's host system, and a PNR is created in the airline's partition in that system as well. What information is sent between airlines, and how, is specified in the Airline Interline Message Procedures (AIRIMP) manual, although many airlines and CRS's/GDS's have their own direct connections and exceptions to the AIRIMP standards.

If, for example, a reservation is made on United Airlines (which outsources the hosting of its reservations database to the Galileo CRS/GDS) through the Internet travel agency Travelocity.com (which is a division of Sabre, and uses the Sabre CRS/GDS), Travelocity.com creates a PNR in Sabre. Sabre sends a message derived from portions of the Sabre PNR data to Galileo, using the AIRIMP (or another bilaterally-agreed format). Galileo in turn uses the data in the AIRIMP message to create a PNR in United's Galileo "partition."

If a set of reservations includes flights on multiple airlines, each airline is sent the information pertaining to its flights. If information is added later by one of those airlines, it may or may not be transmitted back to the CRS/GDS in which the original reservation was made, and almost never will be sent to other airlines participating in the itinerary that are hosted in different CRS's/GDS's. So there can be many different PNR's, in different CRS's/GDS's, for the same set of reservations, none of them containing all the data included in all of the others.

When a ticket is issued, that is recorded in the PNR; if it is an e-ticket, the actual "ticket", as defined by the airline, is the electronic ticket record in the PNR. When you check-in, the claim check numbers and the weights of your bags are added to the PNR. If you don't show up for a flight on which you are booked, that fact is logged in the PNR. Whenever anything in the reservation is added, changed, or canceled, that information may be communicated back to the CRS/GDS that holds the original PNR. If you call the airline or visit its Web site, and request seat assignments, that is entered in the PNR. If your travel agency or the airline uses Sabre, and you look up your airline reservation on Sabre's "VirtuallyThere.com" Web site, and add a car reservation through VirtuallyThere.com, that goes in the same Sabre PNR.

As now can be appreciated a substantial amount of information is available about a passenger and passenger travels via the PRN. Further, it should be appreciated that it is necessary that this information be available in a form—a data stream—that can be received by an air carrier ticketing agent for recording onto a magnetic stripe. The recording of this information onto a magnetic stripe is required of all airline tickets, but is often ignored on U.S. domestic flights. Instead, for domestic flights, information about the flight and passenger is printed on the boarding document using bar codes printed on the front of the ticket using information generated by the airline about its own domestic flight and not using a downloaded PNR magnetic data stream.

However, if a U.S. airline is to issue boarding documents that will be accepted on international flights it is a necessity that the PNR data be recorded onto a magnetic stripe on the back of boarding documents or the boarding documents will be rejected upon their use on an international flight. This PNR data must be recorded in the order and position dictated in the Airline Interline Message Procedures (AIRIMP) manual.

Therefore, while it has been possible for an airline offering only domestic flights to ignore the international and FAA requirements for use of magnetically recorded PNR information on domestic boarding documents this is not possible for airlines that issue boarding documents for both domestic and international flights. These air carriers are required to receive PNR data and record the required PNR data on a magnetic stripe on ticket and boarding documents to permit the ticket and boarding documents they issue to be accepted during the international leg of their flight schedules or the flight schedules of international airlines for whom they are issuing documents.

Therefore, in view of this requirement airlines that issue international flight documents must use the central computer PNR data streams and magnetic stripe cards for all their flight documents and incur the substantial cost presented by magnetic stripe cards for all their flights or find a means to avoid, at least partially, the costs of magnetic stripe cards while continuing to use the PNR data stream and offer magnetic stripe cards as needed for international flights.

One barrier to a solution to this extra cost is the amount of information that is required to be provided on an airline boarding document or ticket. This quantity of information is far in excess of that which can be contained in a conventional bar code that is commonly used to present the universal product code (UPC) on products. A partial solution to this problem is found in the use of multi-dimensional bar codes (FIG. 6).

Two-dimensional symbology or bar codes were introduced in late 1980's with Code 49. Since then many other multi-dimensional "bar codes" or "codes" have been developed to meet the demand for storage of portable information in as little space as possible. Several terms are used for this type of data storage such as "two-dimensional code" or "2-D code" or "two-dimensional symbology" or "2-D symbology." These names refer to the general class of bar codes or symbols that use more than one physical dimension to store or present or contain information.

One-dimensional bar codes, seen on current packaging, are made up of a series of one-dimensional bars or lines with spaces between. The series of bars and spaces having a varying width present the coded data. A "one-dimensional bar code" is "vertically redundant." The height of the line or "bar" is merely a repetition of the same information that is presented by the width of the line or "bar." The bar height can be lengthened or reduced without information being lost. The vertical redundancy permits the presence of printing defects such as ink blob or printing gap while still allowing the bar code to be read. As the height increases the probability increases that the bar code will be readable.

2-dimensional symbologies or codes can contain far more information within the same space as can one-dimensional bar codes. This presents an advantage when only a small amount of space is available for information storage. Some examples of the multi-dimensional symbologies that are currently available are:

Matrix Code

"Matrix Code" (Table 2) stores data based on the position of black spots within a matrix. Each black spot or element is the same dimension. The position of the element serves to code the data.

3D Barcode 3D bar code is simply a one dimensional bar code that is embossed on a surface. The code is read by using differences in line depth, rather than contrast, to distinguish between bars and spaces. The code can be used where printed labels will not adhere and can be painted or coated and still read. 3-DI 3-DI (Table 2) uses small circular symbols.

Array Tag

Array Tag (Table 2) code is made up of hexagonal symbols and a patented border. Array Tags are capable of encoding hundreds of characters and can be read at distances of more than 50 yards.

Aztec Code

The Aztec Code (Table 2) symbols are on a square grid with a square central bullseye. The smallest Aztec Code format encodes 13 numeric or 12 alphabetic characters, the largest format encodes 3832 numeric or 3067 alphabetic characters.

Code 49

Code 49 uses a series of one dimensional bar codes stacked one on top of another. Each bar code can have between two and eight rows. Every row contains the data in exactly 18 bars and 17 spaces, and each row is separated by a one-module high separator bar.

CP Code

CP Code is made up of square matrix symbols with an L-shaped finder.

Data Matrix

Data Matrix is a 2-D matrix code that can store between one and 500 characters. The symbol is scalable between a 1-mil square to a 14-inch square. Data Matrix symbol has a maximum theoretical density of 500 million characters to the inch. Each symbol has two adjacent sides printed as solid bars, while the remaining adjacent sides are printed as a series of equally spaced square dots. These patterns are used to indicate both orientation and printing density of the symbol.

MaxiCode

Maxicode was developed by United Parcel Service and is made up of a 1-inch by 1-inch array of 866 interlocking hexagons. Approximately 100 ASCII characters can be held in the 1-inch square symbol. The symbol can still be read even when up to 25 percent of the symbol has been destroyed.

PDF 417

PDF417 is a stacked symbology and was invented by Ynjiun Wang in 1991 at Symbol Technologies. PDF stands for Portable Data File, and the symbology consists of 17 modules each containing 4 bars and spaces (thus the number "417"). The code is in the public domain. The structure of the code allows for between 1000 to 2000 characters per symbol with an information density of between 100 and 340 characters. Each symbol has a start and stop bar group that extends the height of the symbol. A PDF417 symbol can be read with modified handheld laser or CCD scanners. High density printers (thermal transfer or laser) should be used to print the symbol.

While multi-dimensional bar codes can provide a means for presenting the high quantity of information that was formerly presented on the magnetic stripe it presently is necessary that air carriers continue to use the available PNR data stream for receiving PNR data and, where required, for recording onto magnetic stripe cards for any international flights they issue.

Therefore, it would be a substantial benefit to air carriers if a means were available which would allow the air carrier to use the PNR magnetic data stream for international flight documents having magnetic stripes thereon while providing the ability to select and sort the information presented in the PNR data stream for conversion into a multi-dimensional symbology that could be printed onto domestic flight documents and permit the airline to avoid the cost of magnetic stripe cards where possible.

It further would be a substantial benefit to air carriers if a means were available which would allow the air carrier to use the PNR magnetic data stream for international flight documents having magnetic stripes thereon while providing the ability to select and sort the information presented in the PNR data stream for conversion into a multi-dimensional symbology that could be printed onto domestic air flight documents thereby avoiding the substantial cost of the reader and writer devices that currently are used to read and write magnetic stripe cards in airports.

It further would be a substantial benefit to air carriers if a means were available which would allow air carriers to eliminate the use of ticket and boarding documents having magnetic data recording stripes while preserving the use of the computer software systems associated with the use of the PNR magnetic data stream thereby producing a cost savings for the airline industry by eliminating, altogether, the reading and writing equipment associated with the use of magnetic stripe cards as well as eliminating the use of magnetic stripe cards while allowing for the inclusion of additional passenger information such as digital photographic data of the passenger and baggage identities.

SUMMARY OF THE INVENTION

A device and method are provided for receiving a stream of data appropriate for recording onto the magnetic stripe of airline flight documents from a shared computer reservation system, identifying data within the data stream which is desirable for presenting on an airline document, converting the magnetic stripe data stream code into a multi-dimensional symbology and printing the multi-dimensional symbology onto an airline flight document. The method further includes the scanning of the printed multi-dimensional symbology on an airline flight document into a computer memory or memory buffer for transformation of the multi-dimensional symbology image onto a human readable data format and a format readable by the particular user airline system (host format).

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

Figure 4:
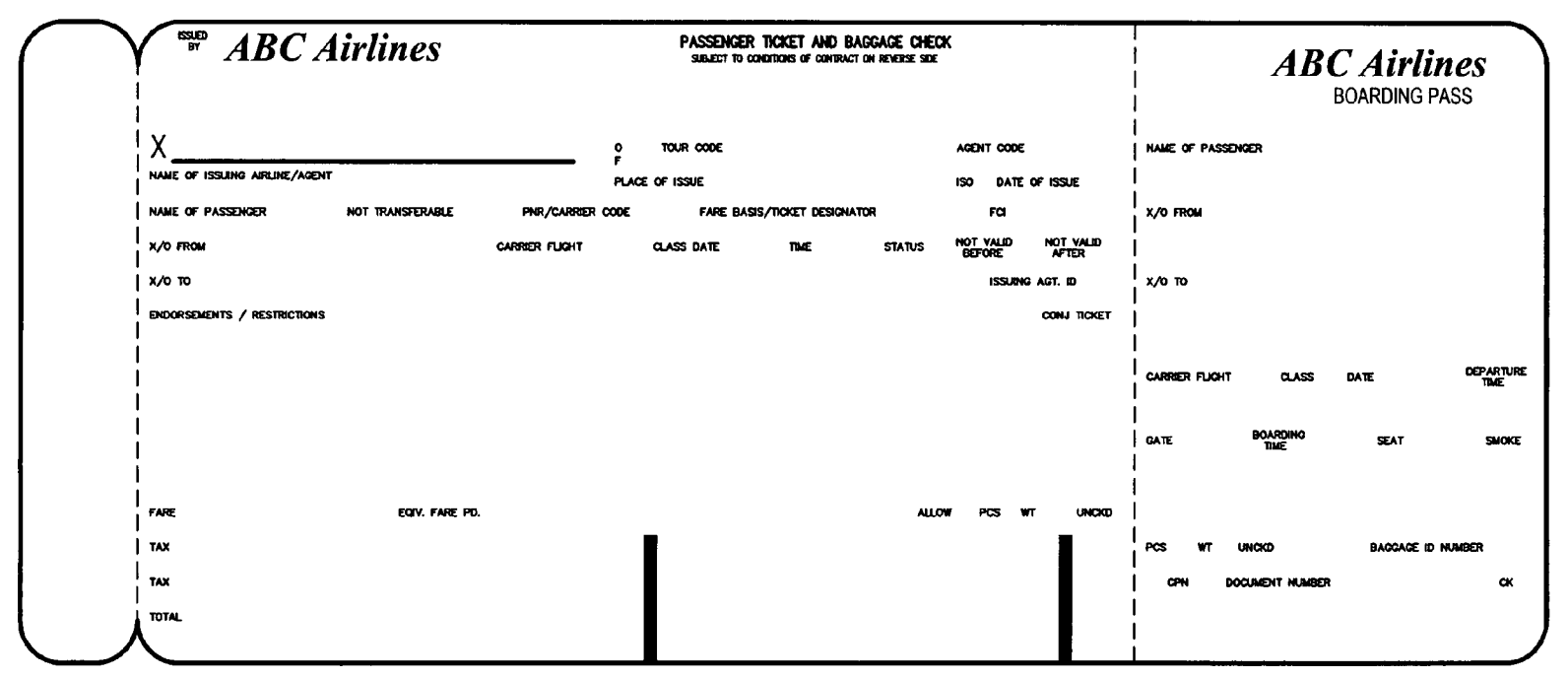

FIG. 4 shows the front face of a typical airline ticket/boarding magnetic stripe document.

DESCRIPTION OF THE PREFERRED EMBODIMENT

Figure 1:
FIG. 1 shows the front face of a typical airline ticket/boarding non-magnetic stripe document having barcode data printed thereon, but which code is not generated from magnetic data stream code, but which is showing bar code information which is entered by the particular airline ticket agent onto the ticket at the customer check-in counter by use of an ASCII data stream code.
Figure 2:
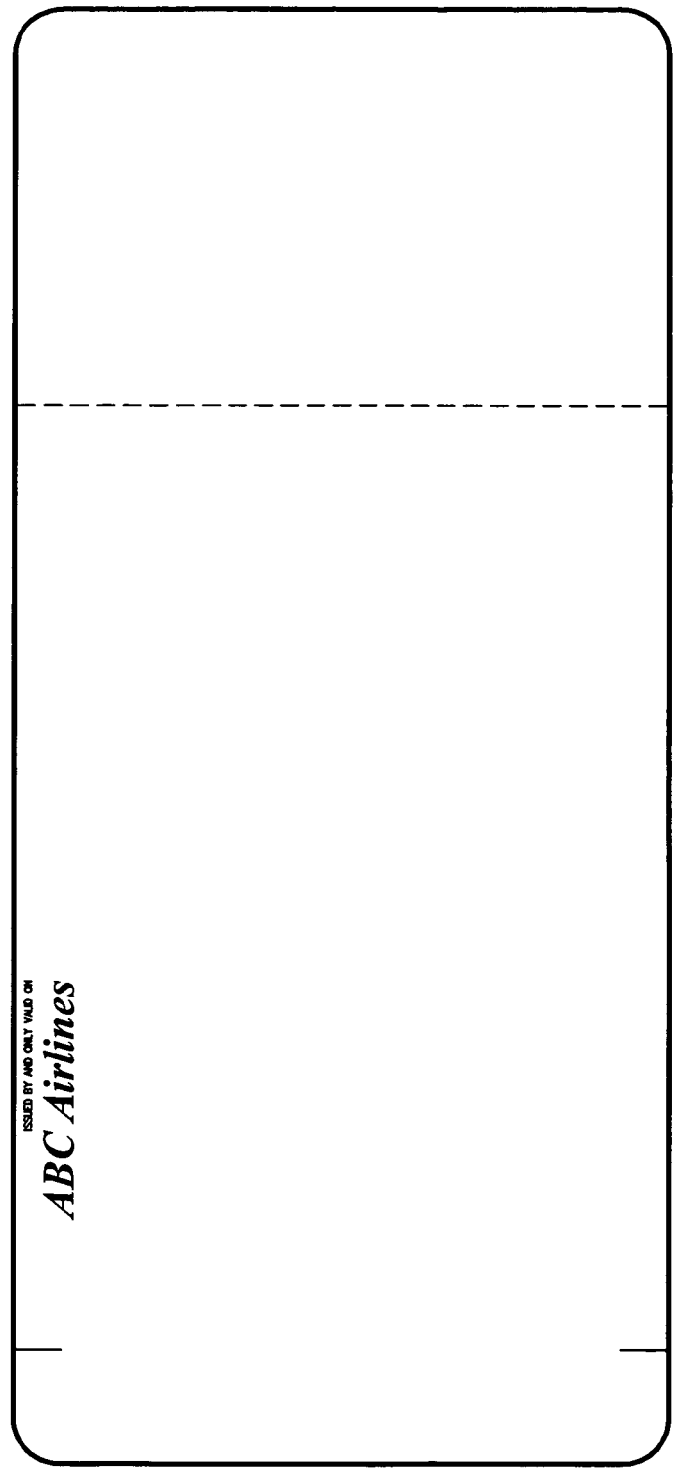
FIG. 2 shows the front face of a typical airline ticket/boarding non-magnetic stripe document capable of having barcode data printed thereon, but which code is not generated from magnetic data stream code, but which is showing bar code information which is entered by the particular airline ticket agent onto the ticket at the customer check-in counter by use of an ASCII data stream code.
Figure 3:
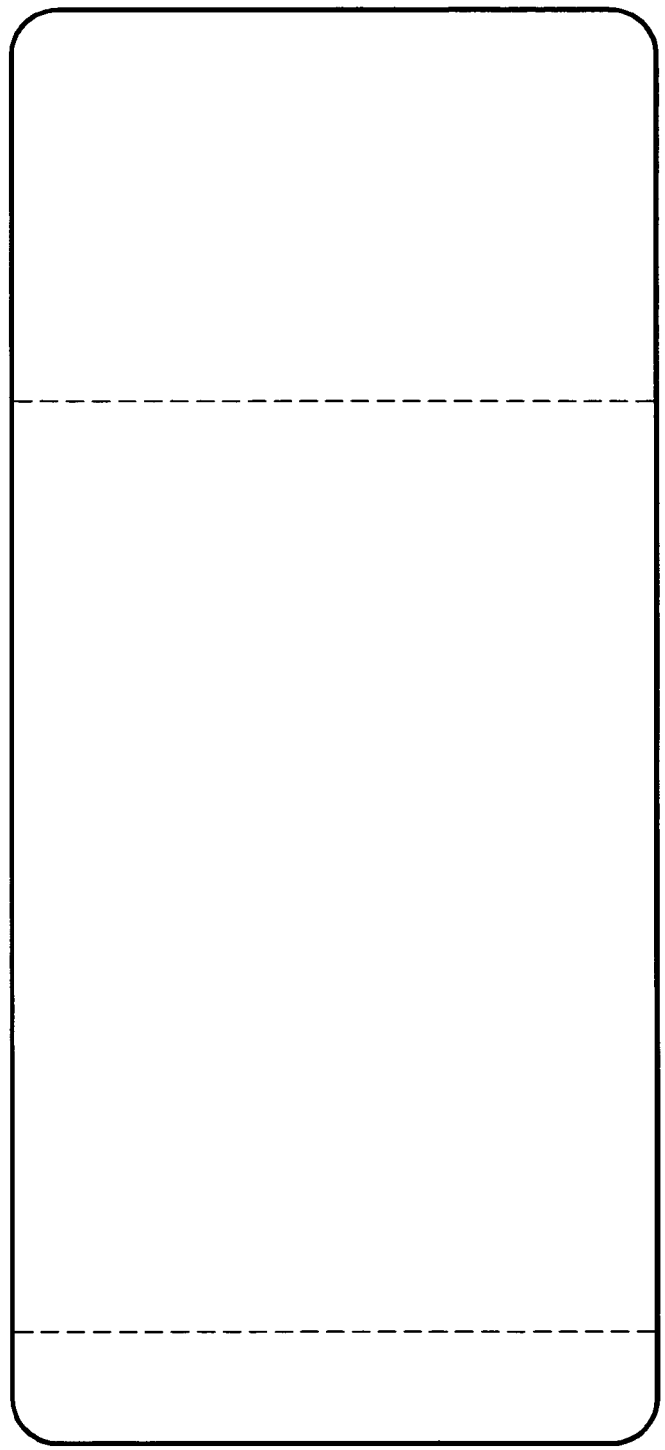
FIG. 3 shows the rear face of the airline ticket/boarding non-magnetic stripe document of FIG. 2.
Figure 5:
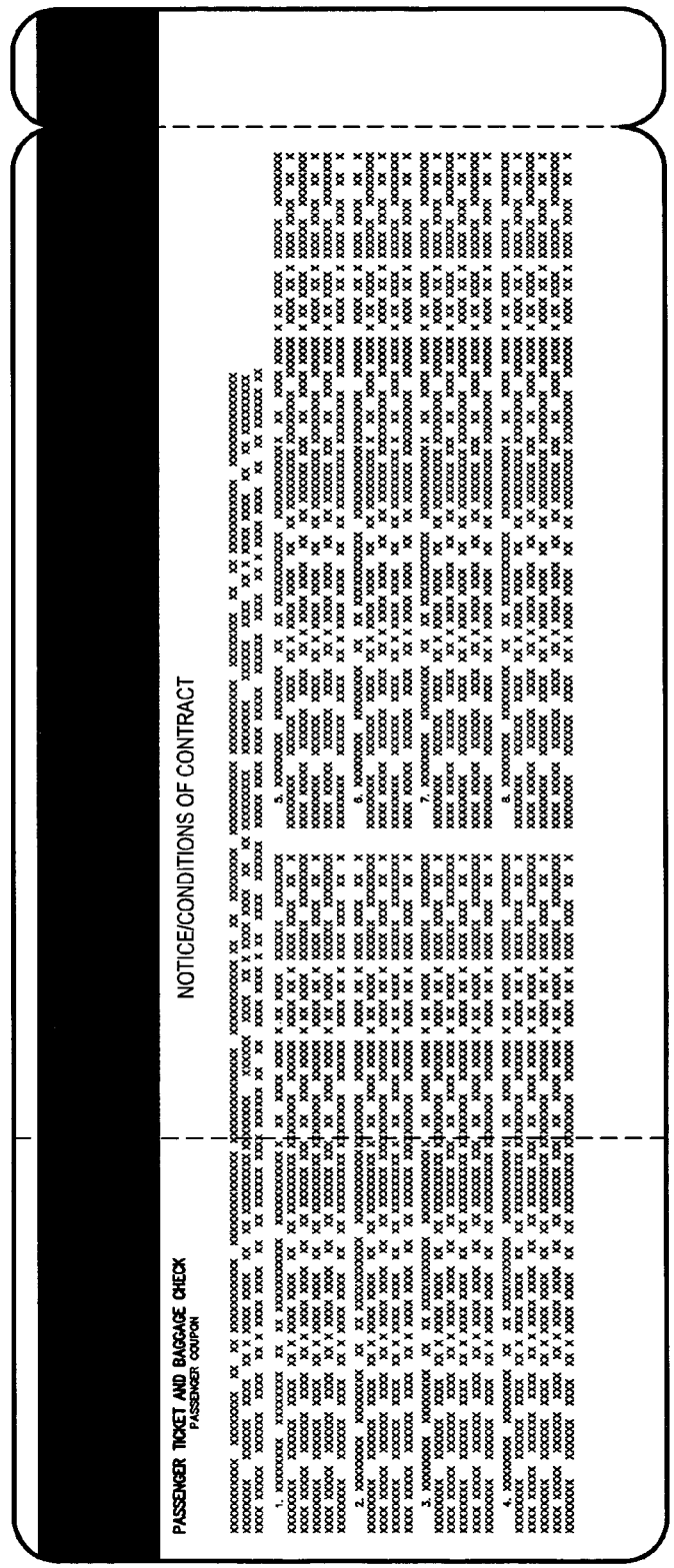
FIG. 5 shows the rear face of a typical airline ticket/boarding magnetic stripe document and showing the magnetic stripe thereon.

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

When an airline passenger makes a flight reservation, information about that passenger is entered into a central flight reservation computer system. The information is then available to a number of different airlines and available to travel booking agencies and/or hotels and/or car rental agencies. This information is commonly known as the PNR or PNR data or PNR information.

The information initially entered into the passenger reservation computer system includes the passenger name, address, phone number and if the passenger is a member of an airline "frequent flyer" program. The central computer information also will include passenger preferences such as aisle or window seating, type of meal request, etc. Additional information that will be contained in the central computer file relating to that particular passenger and the particular flight for that particular passenger will be the value of the ticket, boarding information such as seat, date of flight and flight number, the number of bags checked which would be added to the information upon check-in for the flight, the class of service such as first class or coach, the value of each leg of the flight, and the passenger name record number (PNR). In addition to this information, the bag number or bag sequence number for checked baggage can be included or the fact that no baggage was checked. With the advent of increased security considerations on airlines, additional information may be added to the passenger file regarding security issues. This information can include an indication that any carry-on bags should be hand checked, an indication to hand check checked luggage, a notation to deny boarding to the passenger, or an indication to isolate the passenger in a secured area, as well as, additional and/or new security issues which relate to passengers and which will arise from time to time. It is an important aspect of this information that it not be in human readable form so that the cautionary notes regarding a passenger may travel with the passenger's ticket which is in the passenger's possession but not provide notice to the passenger that a particular security issue has been applied to them.

To accomplish this, heretofore, the PNR information has been stored on the ticket by recording it in magnetic recordable form onto a magnetic stripe that has been applied to the ticket. In addition to the magnetic stripe information, a certain portion of the PNR information which is desired to be human readable is printed on the front of the ticket. This need for dual formatting of information on tickets has been achieved by the formatting of some PNR information so that it may be recorded onto the magnetic stripe and the formatting of some information within the database so that it may be printed onto the front of the ticket. The formatting used, generally, has been to provide the information in two different manners, that is to provide the human readable information identified as a "print" or printable ASCII data stream and to present the majority of the PNR information in the form of a magnetically recordable or magnetic data stream. The printable ASCII data stream is accepted commonly by printers and used to represent the data directly into human readable alpha numeric representations. In this case, the print ASCII data stream is used to contain the information which is printed in human readable fashion on the front of the airline ticket and which is generally limited to passenger name, seat number, date of flight and flight number.

The print ASCII data stream information may or may not be duplicated within the magnetic information data stream which is offered by the central computer. The additional information previously described, in addition to passenger name, seat number, date of flight and flight number and which is contained in a magnetically recordable data stream is a separately provided data stream and distinct from the human readable data which is in the printable ASCII data.

This division of information between the human readable data stream and the magnetically recordable data stream has presented some airlines with the method of operation of simply excluding the use of the magnetic data stream and airline documents containing a magnetic stripe and using only the printable ASCII data stream to provide only human readable data presentation on the front of the ticket. This is done to save costs and also can be accomplished where the airline deals only with, or mainly with, passengers engaging in domestic flights in the United States and not passengers who will, during a course of their flights during a particular sequence of flying, encounter any international gates. The advantages to using only the printable ASCII data to present human readable data on airline ticketing and boarding documents was set forth previously in the cost analysis of magnetic stripe equipped documents and the relatively high rejection rate (ten percent to fourteen percent) during the use of such magnetic stripe documents.

The present inventive device and method permit airlines which must include the contents of the magnetically recordable data stream on an airline ticket, either to conform with international flight requirements or with FAA requirements, to do so while avoiding the cost of magnetic stripe equipped documents. This method is accomplished, generally, by receiving at the airline document printer the magnetically recordable data stream or data elements from the central computer, excluding the data stream portion presented in printable ASCII format and converting at the printer the remaining magnetic data stream contents into a two-dimensional symbology or two-dimensional bar code format which is then printed onto the airline ticket or boarding documents through the use of bar code printers and reading of the information with bar code scanners. Such printers and readers and scanners of bar codes are far less expensive than the magnetic data readers and writers conventionally used with magnetic stripe data recording airline ticket and boarding documents.

It should be appreciated that the use of two-dimensional bar codes for printing onto airline ticketing and baggage documents is not in and of itself new. At least two airlines, Alaska Airlines and Southwest Airlines, have recently started use two-dimensional bar codes for representation of the human readable information printed on the front of an airline boarding pass. However the data streams used in these cases does not involve any of the magnetically recordable data instructions involved in the recording of magnetic data.

For example, in the current utilization of an airline boarding or ticket document that contains magnetic recording media the sequence of operations is as follows. In recording data onto a magnetic stripe document, the host computer sends the message which directs the magnetic recording device to check the magnetic stripe on the back of the document. The first part of the host computer message alerts the recoding device to prepare the document to receive a magnetically recordable data stream. The host computer then provides a magnetically recordable data stream that contains formatting codes directing the recording device to the location on the magnetic stripe at which the individual data elements of the magnetic data stream are to be recorded. The host message then provides the magnetic data stream and the direction to record the data on the magnetic stripe.

After the data is magnetically recorded, the host message then directs the recording device to check the recorded magnetic stripe. If the stripe reads accurately the host computer then switches to sending data that is to be printed onto the document along with print formatting codes and directions to print the data. However, if the magnetic stripe on the document cannot be read properly that magnetic stripe document is rejected, and is voided, and then the process begins again with a new magnetic stripe document on which the recording device attempts to record the magnetically recordable data stream.

In the case of Southwest Airlines a data stream that is coded only for printing and that is not coded for magnetic recording is sent from the Southwest host computer database to the local computer being used by the ticketing agent. The ticket agent's local computer then receives the printable data and converts some or all of the print coded information into a 2D barcode print message and sends the print message to a printer that simply prints the information as instructed. In this instance the printer is a "dumb printer" and cannot self select the information to be printed on the ticket or select information to be converted into a 2D barcode nor does the printer have the capability to convert the information into a 2D barcode or other 2D symbology.

In the case of Alaska Airlines, the ticket agent receives a data stream coded for human-readable printing and a stream of data coded for recording onto magnetic media. Alaska Airlines discards the stream of data coded for recording onto magnetic media and only uses the a data stream coded for human-readable printing. All of the Alaska data stream coded for human-readable printing is then sent to a printer which converts portions of that printable data stream, as received, directly into a 2D barcode and a prints the 2D barcode onto a boarding pass.

In neither case is a "smart printer" involved which receives a stream of data coded for both printing on a ticket and recording onto magnetic media, and selects the stream of magnetic data, and redirects the magnetically recordable data stream through a conversion operation in which the stream of data coded for recording onto magnetic media and the associated formatting codes are converted into 2D symbology and then printed by the printer onto a specified location on the airline document which is different from the magnetic stripe location.

In the case of Southwest Airlines and Alaska airlines the information received at the printer is simply a two-dimensional bar code print message developed from the printable information contained in the data stream from the central computer. These operations do not include or use data that is to be magnetically recorded onto the ticket and which magnetically recordable data stream contains far more information that does the printable data stream. Nor do these operations identify at the printer, from the existing shared computer reservation systems (SCRS) data stream, the available magnetically recordable data and convert that data at the printer for printing as a two-dimensional symbology that includes the magnetic formatting codes which would allow for reconstruction of a magnetically recordable data stream from the two-dimensional printed symbol.

Therefore, heretofore, a method of accessing and converting the full and complete magnetic data stream information, as required, at least, for international flights, has not been available and has not been used for conversion of magnetic data stream code into a format which permits airlines to avoid the use of magnetic data stripe cards. As it will be appreciated that the Alaska Airlines and Southwest Airlines examples provided herein do not use magnetic data stripe cards or the magnetic data stream code. Their operations use only the printable ASCII code stream and do so by the exclusion of or ignoring the magnetic stripe data stream code available from the central computer.

Best Mode of a Preferred Embodiment

Under the present invention, the airline ticketing agent or other individual wishing to retrieve magnetic data stream information regarding a passenger and present that magnetic data stream information while avoiding the use of magnetic stripe recording, calls up the information from an airline central computer shared system and initiates the downloading of the data stream related to the particular reservation or PNR. The data stream containing the magnetic stripe information from the computer reservation system or global distribution system is received at the particular airline ticketing terminal, whether that terminal be at a travel agency or at an airline operated ticket counter, and the information is stored into a memory buffer in the printer processor. The magnetic code or magnetic data stream is then released from the buffer memory and any print ASCII format data is removed from the magnetic code data stream. The ASCII data may either be printed onto a ticket or document in human readable form or stored for later use or deleted.

The magnetic code or data stream is then operated on by the printer processor to compare the data stream against itself for redundant occurrences of the same data and to eliminate the duplicate occurrences of the data. At this point, it will be appreciated that the magnetic data stream, without redundant data entries, consists of, generally, an element identifier label; the element contents and a field separator in repeated form such that the data stream would appear, for example, as follows, but as binary data or other form that is recordable on magnetic media:

TABLE 1

07Smith#08Joan#09816-374-0583#
112D#1402272004#15134.57#183#
195648#20F#2378.57#27DNB#
30Secure-AFF##07Smith#08Joan#
09816-374-0583#112D#
1402272004#15134.57#183#
195648#20F#2378.57#27DNB#
30Secure-AFF##

The information contained the Table 1 can be interpreted as follows:

| Element identifier label | Element contents | field separator |
|---|---|---|
| 07 | Smith (Last Name) | # |
| 08 | Joan (First Name) | # |
| 09 | 816-374-0583 (Telephone No.) | # | where each element identifier label is specific to a particular type of data, e.g., 07 identifies that the information following the label 07 is the last name of the passenger.

Once the magnetic data stream has exited the memory buffer and has been operated on by the processor to reduce or eliminate redundant occurrences of data, the newly formed non-redundant data is then compressed using a standardly available data compression program such as PKZip or Winzip, and the compressed data is then converted into any one of several available multi-dimensional symbologies or multi-dimensional bar code formats, and the representation of the data which is now in the form of a printable bar code is transmitted to a printer head for printing onto the airline ticket or boarding pass or other airline document.

In an alternative embodiment, it may be desirable to add to the data stream parametric table (Pectab) data which is used to define the print and magnetic strip locations for each particular datum which is contained within the magnetic code data stream. The Pectab data may be unique for each airline or may be specified by an airline group such as the Association of European Airlines (AEA) in their joint technical specifications which are to be used in preparing documents.

In view of the variety of Pectabs that are available (each airline may have its own, and there may be a different Pectab for each type of document being printed), a particular example of a Pectab incorporated within the data for service subsequent compression and conversion into a 2-D symbology will not be specifically set forth here. Rather, a generalized format of a Pectab appear as follows:

A1/26#07Smith#A27/36#08Joan#
G1/12#09816-374-0583#
D45/50#112D# C1/17#1402272004#
G40/47#15134.57# F1/2183# 1927-
5648#B47/51#20F#G40/482378.57#
27DnB#30Secure-Yes##

The information of Table 2, using the provided phantom Pectab could allocate and present the data stream of Table 2 on a boarding document in the following positions:

TABLE 3

```
         1         2         3         4         5
1234567890123456789012345678901234567890123456
A  Smith                   Joan
B                                      1ST Class
C  Feb. 27, 2004
D  DNB                                  Seat 2D
E  Secure                        Flight No. 5648
F  3 Bags Checked                       134.57
G  816-374-0583                         2378.57
```

| | |
|---|---|
| A1/26#07Smith# | Last Name Smith |
| A27/36#08Joan# | First Name Joan |
| G1/12#09816-374-0583# | Telephone No. 816-374-0583 |
| D45/50#112D# | Seat 2D |
| C1/17#1402272004# | Flight Date Feb. 27, 2004 |
| G40/47#15134.57# | Leg cost $134.57 |
| F1/2#183# | Bags checked 3 |
| E45/51#195648# | Flight No. 5648 |
| B47/51#20F# | First Class |
| G40/482378.57# | Total ticket cost $2,378.57 |
| D1/3#27DNB# | Do not allow to Board |
| E1/6#30Secure-Yes## | Hold passenger in a secure area |

Figure 6:
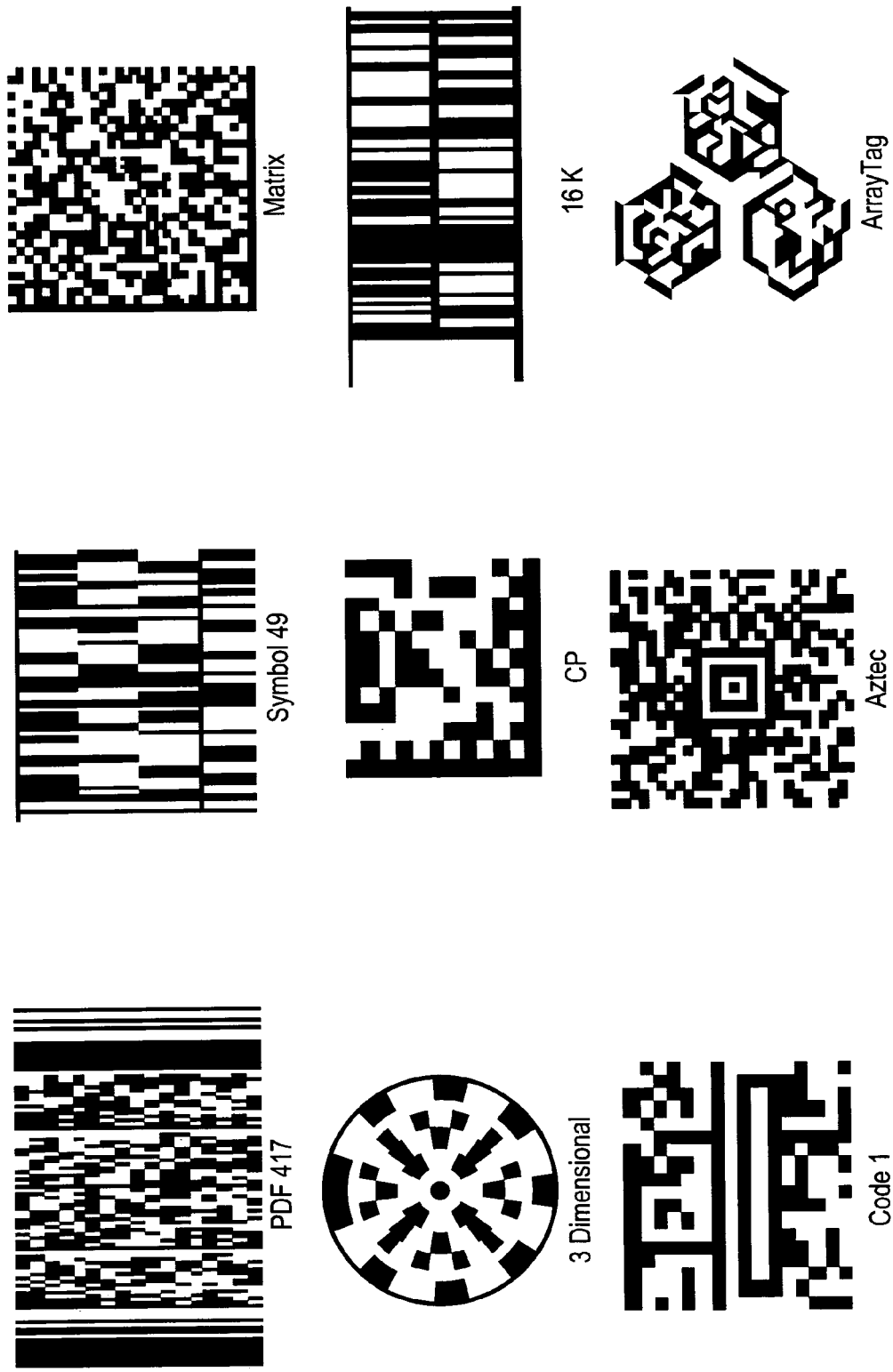
FIG. 6 shows various examples of multi-dimensional symbology or barcodes which are presently in use.

The resulting data stream of Table 1 or Table 2 would be converted into a multi-dimensional symbology or bar code that uses for example PDF 417 (see FIG. 6) or Symbol 49 (see FIG. 6).

Conversion of the Multi-dimensional Symbology

When it is desired to retrieve the information printed in the two-dimensional symbology from the ticket, a scanning device is used to scan the multi-dimensional bar code. The various manufacturers of two-dimensional bar codes provide for scanner devices which can be used to scan their particular bar code format and, thus, are well known in the art and will not be further described within this specification. The scanned data image is transmitted to a memory buffer in the scanning device, and the information is extracted from the buffer and compared by an image interpreter and converter software which permits the interpretation of the particular multi-dimensional symbology or bar code and conversion of the bar code image into binary or ASCII code data stream from which the data may then be converted into human readable format for display on a CRT or LCD display or other human readable display or for printing of the information onto a paper document. As will be appreciated from the previous description, the multi-dimensional bar code may or may not include Pectab data. In the situation in which Pectab data is included within the multi-dimensional code, the computer reading the scanned image can detect the Pectab information and transmit the data to the CRT or LCD display or format the data for the printer based upon the Pectab contained within the multi-dimensional symbology. Alternatively, if no Pectab data is included within the multi-dimensional symbology, the reading device or computer will access a Pectab which is indicated for use by the operator and will associate various data stream components with the downloaded Pectab to allow formatting and positioning of data extracted from the multi-dimensional bar code into the proper positions for use.

It will be appreciated by those skilled in the art that the ability provided by the present invention to encode substantially more information onto an airline ticket or boarding document will permit the addition of other security information onto the ticket in the form of the multi-dimensional symbology. One such example is the use of digital photographs of the passenger and/or passenger luggage and/or passenger carry-ons which can then be converted into multi-dimensional symbology or bar codes and printed onto the ticket. Then upon final boarding, the photographic information can be scanned, and the photograph of the individual encoded onto the ticket can be compared with the individual presenting the ticket. It will be appreciated that as the photographs are taken within a few moments or few days of being reexamined for security purposes, that the photographs will quite closely and accurately reflect the appearance of the individual and will not suffer from changes in appearance which can occur over longer periods of time as are found on, for example, passport photographs which may be five or ten years old at the time they are compared with the individual. Further, it will be appreciated that the opportunity to take such a photograph at the time that a potential passenger confirms their identity, either through the use of a passport or a driver's license or other identity documents, time will be allowed for scrutiny of the individual's background as the ticket is obtained several days in advance of the airline flight, and with the photograph then being downloaded and encoded onto the ultimately issued boarding document it will serve as a means of verification that the individual who purchased or obtained the original reservation is in fact, the individual presenting the boarding document just prior to their entry onto the aircraft. In this manner, an individual who is a security risk would not be able to employ the use of another individual to initially make the airline reservation to thereby avoid being recognized as a security risk for the flight.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive method for providing and printing multi-dimension symbology or multi-dimensional bar codes of the magnetic data stream onto airline documents are performed, constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is as follows:

1. A method of receiving a data stream formatted for recording onto magnetic stripe media from a shared central reservation computer offering passenger air travel information to multiple airlines and selecting and converting said data stream into multi-dimensional symbology for printing onto airline documents comprising the steps of:

receiving from a shared central reservation computer a data stream containing formatting codes to allow recording of said data stream onto a magnetic stripe media, selecting from said data stream at least a portion of said data for recording onto said magnetic media to provide a selected data stream, identifying said formatting codes of said selected data stream, removing said formatting codes from said selected data stream to provide second data stream, converting said second data stream into a multi-dimensional symbology data set, and printing said multi-dimensional symbology data set onto an airline document to provide an airline document containing a printed multi-dimensional symbology data set.

2. The method as claimed in claim 1 further comprising the step of compressing said second data stream prior to said converting step.

3. The method as claimed in claim 1 further comprising the step of printing said second data stream as alphanumeric information onto an airline document.

4. The method as claimed in claim 1 further comprising the steps of:

scanning said airline document containing a printed multi-dimensional symbology data set to provide a scanned data set image, storing said scanned data set image into a computer memory register, converting said scanned data set image into a data stream suitable for comparison with a data stream formatted for recording onto magnetic stripe media from a shared central reservation computer.

5. The method as claimed in claim 1 wherein said printing of said multi-dimensional symbology data is at a second location on said airline document that is different from a first location identified in said data stream from said shared central reservation computer.

6. The method as claimed in claim 1 further comprising the step of converting a digital photograph of an airline passenger into a multi-dimensional symbology data set and printing said multi-dimensional symbology data set containing said digital photograph onto an airline document.

* * * * *